(12) United States Patent
Bielmeier et al.

(10) Patent No.: US 11,815,878 B2
(45) Date of Patent: Nov. 14, 2023

(54) CONTAINER-PROCESSING SYSTEM AND METHOD HAVING SAFETY-ORIENTED MANAGEMENT OF SETTINGS FOR A CONTAINER-PROCESSING SYSTEM

(71) Applicant: Krones AG, Neutraubling (DE)

(72) Inventors: Theodor Bielmeier, Neutraubling (DE); Timo Pronold, Neutraubling (DE); Pino-Guiseppe Palumbo, Neutraubling (DE); Thomas Stauber, Neutraubling (DE); Stefan Schmidt, Neutraubling (DE)

(73) Assignee: Krones AG, Neutraubling (DE)

( * ) Notice: Subject to any disclaimer, the term of this patent is extended or adjusted under 35 U.S.C. 154(b) by 599 days.

(21) Appl. No.: 16/981,410

(22) PCT Filed: Jan. 29, 2019

(86) PCT No.: PCT/EP2019/052098
§ 371 (c)(1),
(2) Date: Sep. 16, 2020

(87) PCT Pub. No.: WO2019/174806
PCT Pub. Date: Sep. 19, 2019

(65) Prior Publication Data
US 2021/0026331 A1  Jan. 28, 2021

(30) Foreign Application Priority Data
Mar. 16, 2018 (DE) .................... 10 2018 106 245.1

(51) Int. Cl.
*G05B 19/4155* (2006.01)
*B65B 57/00* (2006.01)
(Continued)

(52) U.S. Cl.
CPC .......... *G05B 19/4155* (2013.01); *B65B 57/00* (2013.01); *G06F 21/31* (2013.01);
(Continued)

(58) Field of Classification Search
CPC ...... G05B 19/4155; G05B 2219/35513; G05B 2219/32398; G05B 19/41865;
(Continued)

(56) References Cited

U.S. PATENT DOCUMENTS

| 5,317,729 A | 5/1994 | Mukherjee et al. |
| 5,539,906 A | 7/1996 | Abraham et al. |
| 2014/0100668 A1 | 4/2014 | Jundt et al. |

FOREIGN PATENT DOCUMENTS

| DE | 102010033170 A1 | 2/2012 |
| DE | 102014000701 A1 | 7/2015 |
| DE | 202016104631 U1 | 11/2016 |

OTHER PUBLICATIONS

International Search Report from the European Patent Office dated Jun. 3, 2019 for International Application No. PCT/EP2019/052098.
(Continued)

*Primary Examiner* — Tejal Gami
(74) *Attorney, Agent, or Firm* — Sean Mellino

(57) ABSTRACT

The invention relates to a container-processing system and to a method having safety-oriented management of settings for a container-processing system. The container-processing system comprises: at least one container-processing machine for processing containers, at least one container-processing machine having a type memory, in which different data sets for types of processing to be performed by the container-processing machine are stored and can be selected for processing containers; and at least one management device for managing the storing of the data set, the at least one management device being configured, in the event of the
(Continued)

creation of one of the data set, to produce a main version (V1_A to V1_D) of the data set and to assign a status (A to D) to the main version (V1_A to V1_D), to retain the main version (V1_A to V1_D), in case a change is made to the main version (V1_A to V1_D) without a change in the status (A to D), and to additionally create, for the change to the main version (V1_A to V1_D), a secondary version (V1.1_A to V1.N_A; V1.1_B to V1.N_B; V1.1_D to V1.N_D) having the status (A to D) of the main version (V1_A to V1_D), and to set the scope of the access to the main version (V1_A to V1_D) and to the at least one secondary version (V1.1_A to V1.N_A; V1.1_B to V1.N_B; V1.1_D to V1.N_D) by an operator of the at least one container-processing machine in dependence on the status (A to D) and a predefined authorization of an operator.

12 Claims, 4 Drawing Sheets

(51) Int. Cl.
*G06F 21/31* (2013.01)
*G06Q 10/0631* (2023.01)
*G06Q 50/04* (2012.01)
*G06Q 10/0639* (2023.01)

(52) U.S. Cl.
CPC .......... *G06Q 10/0631* (2013.01); *G06Q 50/04* (2013.01); *G05B 2219/35513* (2013.01); *G06Q 10/06395* (2013.01)

(58) Field of Classification Search
CPC ... G05B 19/41845; B65B 57/00; G06F 21/31; G06Q 10/0631; G06Q 50/04; G06Q 10/06395; Y02P 90/02
See application file for complete search history.

(56) References Cited

OTHER PUBLICATIONS

Written Opinion from the European Patent Office dated Jun. 3, 2019 for International Application No. PCT/EP2019/052098.
International Preliminary Report on Patentability/Translation of Written Opinion from the International Bureau of WIPO dated Sep. 22, 2020 for International Application No. PCT/EP2019/052098.

CONTAINER-PROCESSING SYSTEM AND METHOD HAVING SAFETY-ORIENTED MANAGEMENT OF SETTINGS FOR A CONTAINER-PROCESSING SYSTEM

CROSS-REFERENCE TO RELATED APPLICATIONS

This application a 371 National Stage application of International Application No. PCT/EP2019/052098 filed on Jan. 29, 2019, which claims foreign priority to German (DE) Application Serial No. 10 2018 106 245.1 filed on Mar. 16, 2018, the contents of both of which are incorporated herein by reference in their entireties.

BACKGROUND OF THE INVENTION

Field of the Invention

The present invention relates to a container-processing system and a method having safety-oriented management of settings for a container-processing system.

Description of the Prior Art

A container-processing system is used, for example, in the beverage industry for the manufacture and/or filling and/or packaging of containers. The container-processing system can comprise at least one container-processing machine, such as for example, one or more of a blow molding machine and/or, a cleaning machine and/or, a filling machine and/or, a labeling machine, and/or a packaging machine. Containers may be in particular cans, glass bottles or plastic bottles. The containers are transported with a transport device between the individual machines of the container-processing system. For quality assurance, inspection devices are generally also provided which inspect the treated containers and, if necessary, reject them as faulty.

It is possible that the container-processing system is configured for processing different containers, such as containers with a capacity of 0.33 or 0.5 or 1 liter, etc., or for filling different beverages into one and the same type of container or for packaging the containers in a bundle of two or four or six containers and/or with various packaging materials such as films, cardboard, etc. Depending on the container, beverage or container, a different label or different equipment may be attached to the container. Thus, during the operation of the container-processing system, various system states occur to which the container-processing system is to be set, respectively.

For the setting, setting values are defined which the individual container-processing machine or the entire container-processing system requires for the intended production of the containers. The setting values are saved in a setting value data set, which is also referred to as a recipe. Depending on the type of container to be processed, different setting value data sets can be loaded in order to adjust the individual container-processing machine or the entire container-processing system to the various operating cases.

The problem, however, is that the setting value data set comprises many different parameters which may influence one another as the case may be. Therefore, the setting value data set is typically optimized by several test runs during commissioning. As a result, the commissioning of such a container-processing machine or system takes a lot of time. The commissioning of the machine or system may even overlap with production, for example, if new products are to be added to the range of goods of the machine or system. As a result, both the manufacturer's service personnel, and the machine or system operator, work alternately with the setting value data set. Herein, it is often difficult and therefore time-consuming to determine to what extent the setting value data set still has the intended optimizations or has already been further changed or even overwritten by another user.

Another problem is that once the machine or system has been commissioned, the quality of the container processing also depends on the operating conditions that exist in each case. Such conditions are, for example, fluctuations in the quality of consumables for the production or changing environmental conditions, such as temperature fluctuations, etc. Even if such fluctuations can be partially compensated by control technology, permanent adjustments of at least one parameter of the setting value data set often may be necessary. Herein, however, it is required that no other quality or performance features of the machine or system are impaired or are no longer accessible or the machine or system is damaged or even an operator of the machine or system is harmed by the adaptation. In practice, this requires the operators of the machine or system to develop and use sometimes very cumbersome, time-consuming workaround solutions in order to cope with commissioning and everyday production and to avoid production downtime.

SUMMARY OF THE PRESENT INVENTION

It is therefore the object of the present invention to provide a container-processing system and a method having safety-oriented management of settings for a container-processing system with which the aforementioned problems can be solved. In particular, a container-processing system and a method having safety-oriented management of settings for a container-processing system are provided, in which the setting and/or conversion for the container-processing system can be carried out as quickly as possible with a high level of safety for people, system and production quality.

The object is achieved by a container-processing system according to claim 1. The container-processing system has at least one container-processing machine for processing containers, wherein at least one container-processing machine comprises a type memory in which different data sets for a type of processing to be performed by the container-processing machine are stored and are selectable for processing containers, at least one management device for managing the storing of the data set, wherein the at least one management device is configured, in the event of the creation of one of the data set, to generate a main version of the data set and to assign a status to the main version, to retain the main version, in case a change is made to the main version without a change in the status, and to additionally create, for the change to the main version, a secondary version having the status of the main version, and to set the scope of the access to the main version and to the at least one secondary version by an operator of the at least one container-processing machine in dependence on the status and a predefined authorization of an operator.

With the container-processing system, all users of the system can work safely and flexibly with the setting value data sets along the product life cycle without having to develop and use cumbersome, time-consuming workaround solutions. As a result, the commissioning of the container-processing system can be shortened and thus made more cost-effective. In addition, production downtimes caused by inadvertent overwriting of setting value data sets can be safely avoided.

Thus, the described container-processing system offers, by the status-dependent assignment of rights and versioning of setting value data sets or recipes, the great advantage that the operators of the system can react to changes in the operating conditions with maximum flexibility during the entire period of use of a setting value data set. At the same time, operators can be sure that only one data set is used. For this data set, it is always clear what the current processing status of this setting value data set is.

This increases the availability of the container-processing system, which means that the operating costs for the container-processing system can be reduced.

Advantageous further developments of the container-processing system are given in the dependent claims.

The at least one management device can also be configured to overwrite the main version of the first status by a main version of the second status in case the status of a first status is changed to a second status and to overwrite all secondary versions of the first status.

In a special embodiment, the status comprises the states "new", "set", "accepted" and "production".

In a further embodiment, the at least one management device is configured to create a logbook for each data set when generating the first main version and to record in the logbook all actions starting from the initial generation of the data set up to the use in the processing of containers.

It is possible for the at least one management device to be configured to store in data what authorization an operator of the at least one container handling machine has with regard to reading or writing the versions of the data sets for their respective status. Additionally or alternatively, the at least one management device is configured to switch an operating device of the at least one container-processing machine depending on the status and the predetermined authorization of an operator such that the operating device is at least partially functional or to at least partially block the execution of the actions.

According to a further embodiment, the at least one management device is configured to assign to each newly created data set, the status, to which an operator who has all authorizations to edit the data set, is displayed a note when editing the data set, that the set can cause damages to the at least one container-processing machine.

According to yet another embodiment, the at least one management device is configured to store in data a maximum number of secondary versions and to delete the oldest secondary version in case the number of secondary versions already stored equals the maximum number for secondary versions.

According to one embodiment, the at least one management device is configured to provide for the operator, in addition to a maximum number for secondary versions, a predetermined number of memory positions to which the operator may store a secondary version together with the assigned status.

It is also conceivable that the at least one management device is configured to only store a new secondary version, in case the data set corresponding to the new secondary version differs from the data set of the last secondary version.

According to one embodiment, the at least one management device is configured to store a main version and/or a secondary version in at least one external memory medium, before the management device deletes the main version and/or a secondary version from the type memory due to a change in status or due to a predetermined demand.

The at least one container-processing machine may comprise one or more of a blow molding machine and/or a cleaning machine and/or a heat treatment machine and/or a filling machine and/or an equipment machine and/or a packaging machine and/or a palletizing machine.

The object is also achieved by a method having safety-oriented management of settings for a container-processing system according to claim 12. The container-processing system comprises at least one container-processing machine for processing containers, wherein at least one container-processing machine comprises a type memory in which different data sets for a type of processing to be performed by the container-processing machine are stored and are selectable for processing containers, wherein the at least one management device performs, for managing the storing of the data set, the following steps: generating, in the event of the creation of one of the data sets, a main version of the data set and assigning a status to the main version; retaining the main version, in case a change is made to the main version without a change in the status; and to additionally create, for the change to the main version, a secondary version having the status of the main version, and setting the scope of the access to the main version and to the at least one secondary version by an operator of the at least one container-processing machine in dependence on the status and a predefined authorization of an operator.

The method achieves the same advantages that are mentioned above with regard to the container-processing system.

Further possible implementations of the invention comprise also combinations of features or styles described above or in the following by reference to the embodiments, even if they are not explicitly mentioned. Herein, the person skilled in the art may also add single aspects as improvements or additions to the respective basic form of the invention.

BRIEF DESCRIPTION OF THE DRAWINGS

In the following, the invention is described in more detail by means of embodiments and with reference to the appended drawing Figures, wherein.

DETAILED DESCRIPTION OF THE PRESENT INVENTION

In the figures, the same or functionally same elements are provided with the same reference signs unless given otherwise.

Figure 1:
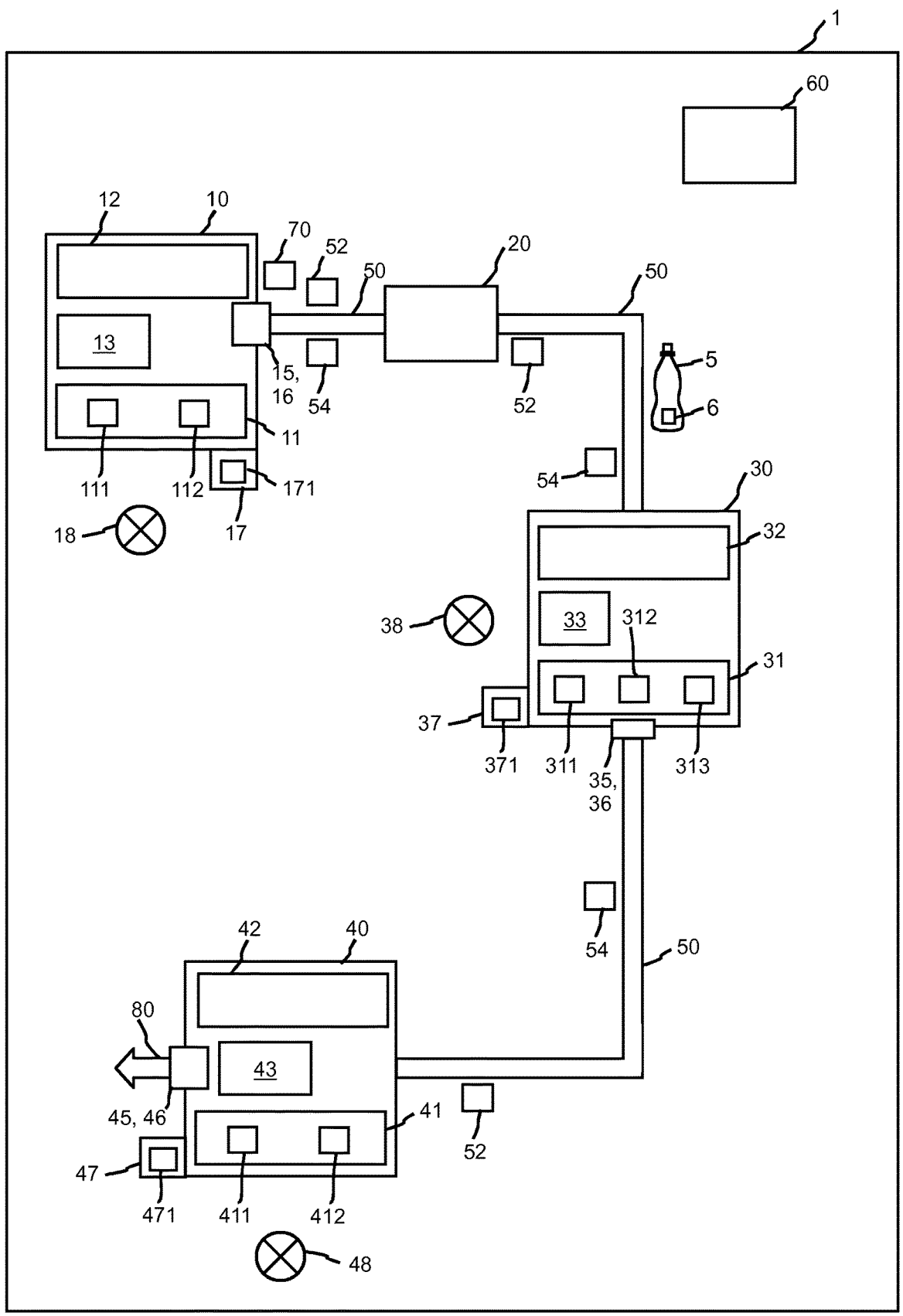
FIG. 1 shows a schematic block diagram of a container-processing system according to a first embodiment.

FIG. 1 shows, schematically, a container-processing system 1 for treating containers 5. The containers 5 can either be finished containers, such as glass or plastic bottles, cans, etc., or alternatively preforms. In the container-processing system 1 in FIG. 1, the containers 5 can be produced from the preforms. The preforms may be made of plastic, such as for example polyethylene terephthalate (PET), polypropylene (PP), etc. and also may be containers, even if they are containers which are still unfinished or untreated by the container-processing system 1. The finished containers 5 in FIG. 1 may be as an example bottles into which a product can be filled. The product can in particular be a drink, a cleaning agent, etc. The containers 5 can be provided with a label 6 in the container-processing system 1.

In the specific example of FIG. 1, the container-processing system 1 comprises a first container-processing machine 10, a second container-processing machine 20, a third container-processing machine 30 and a fourth container-processing machine 40 as well as transport devices 50 each with a transport device control device 52 and an associated inspection device 54, a control device 60 and a detection device 70. At a location in the container-processing system 1 marked with an arrow 80, the containers 5 are output from the container-processing system 1.

The first container-processing machine 10 has a type memory 11, a machine control device 12, a management device 13 and, for example, a convertible outlet 15, at which a first conversion device 16 is provided for automatically converting the outlet 15 to the respective type of container planned or to be produced. The conversion device 16 can be controlled by a first operator 18 by means of an operating device 17. For this, the operating device 17 can output at least one note 171 if necessary. In the type memory 11, a plurality of setting value data sets (for example, 111, 112) may be stored for different types of containers that can be produced with the container-processing machine 10. The management device 13 is used to manage different versions of the setting value data sets (for example, 111, 112), which can also be referred to as recipes.

The first container-processing machine 10 can for example be a filling machine for filling the containers 5 with the product, which is combined with a labeling machine for labeling the container 5. It is additionally or alternatively possible for the first container-processing machine 10 to comprise a stretch blow molding machine having a heating device for producing plastic containers from preforms as the container 5. Additionally or alternatively, a combination of a stretch blow molding machine with an equipment machine, such as a labeling machine and/or printing machine, and a filling machine or any other block design is possible. Each individual machine preferably has a type memory in such a block. The block preferably comprises at least one conversion device 15 and at least one control device 16.

The second container-processing machine 20 is connected downstream of the first container-processing machine 10 in the transport direction of the containers 5. The second container-processing machine 20 comprises, for example, one or more product-processing machines for pasteurizing, cooling or warming up the containers 5 processed, for example filled, by the first container-processing machine 10.

The third container-processing machine 30 is connected downstream of the second container-processing machine 20 in the transport direction of the containers 5. The third container-processing machine 30 has a type memory 31, a machine control device 32, a management device 33 and a convertible outlet 35, at which a second conversion device 36 is provided for automatically changing the outlet 35 to the respective type of container planned or to be produced. The conversion device 36 can be controlled by a first operator 38 by means of an operating device 37. For this, the operating device 37 can output at least one note 371 if necessary. Three setting value data sets 311, 312, 313 for the different types that can be produced with the container-processing machine 30 are stored in the type memory 31. The management device 33 is used to manage different versions of the setting value data sets 311, 312, 313.

The third container-processing machine 30 can, for example, be a packaging machine for packing the containers 5 in in particular bundles having a certain number of containers 5, for example six containers 5.

The fourth container-processing machine 40 is connected downstream of the third container-processing machine 30 in the transport direction of the containers 5. The fourth container-processing machine 40 has a type memory 41, a machine control device 42, a management device 43 and a convertible outlet 45, at which a first conversion device 46 is provided for the automatic conversion of the outlet 45 to the respective type of container planned or to be produced. The conversion device 46 can be controlled by a first operator 48 by means of an operating device 47. For this, the operating device 17 can output at least one note 471 if necessary. Two setting value data sets 411, 412 for the different types that can be produced with the container-processing machine 40 are stored in the type memory 41. The management device 43 is used to manage different versions of the setting value data sets 411, 412.

The fourth container-processing machine 40 can, for example, be a palletizing machine for packing the containers on pallets.

In FIG. 1, as an example, the first, third and fourth container-processing machines 10, 30, 40 have a type memory 11, 31, 41, as described above. Of course, as an alternative or in addition, the second container-processing machine 20 can have a type memory in which various setting value data sets for a treatment to be carried out by the associated container-processing machine 20 can be preselected. It is of course possible for all container-processing machines 10, 20, 30, 40 to comprise a type store.

In the type memory 11, at least one setting value data set 111, 112 is stored, which may include, for the associated type, an arbitrary number of data relating to the production of a bottle having a capacity of 0.5 L or of a bottle having a capacity of 1.0 L, or 1.5 L etc. and/or the product to be filled into the container 5. The at least one setting value data set 111, 112 may also include, in particular, data relating to the temperature, to which preforms are to be heated, at what speed the preforms are to be transported through the heating device and/or possibly to be rotated, which blow mold is to be used and how long it has to be closed, etc. In addition, the data for the labels associated with the respective containers 5, in particular wrap-around labels or chest and belly labels, or just the belly label, or the inscription or printing on the labels 6 also may be stored. In the type memory 31, at least one setting value data set 311, 312, 313 is stored which includes an arbitrary number of data relating to the production of a bundle having six bottles, a bundle having two bottles, a special protective film for the bundle, etc. In the type memory 41, at least one setting value data set 411, 412 is stored which includes an arbitrary number of data relating to the use and/or handling of a Euro pallet or a non-Euro pallet for the associated type.

The transport devices 50 transport the containers 5 between the individual container-processing machines 10, 20, 30, 40 from the first container-processing machine 10 to the second container-processing machine 20, etc., so that the containers 5 are output from the container-processing system 1 in the direction of the arrow 80. At least one inspection device 54 is provided on each of the transport devices 50, which inspects the treated containers 5 with regard to their quality, for which purpose the containers 5 are treated again for inspection and, if necessary, are diverted as faulty. If necessary, the treated containers 5 are encoded at or after the inspection device 54 and transported by the transport device 50 to another one of the container-processing machines 20, 30, 40. The inspection device 54 in each case may be a device which is coupled to the transport device 50. Alternatively, it is possible that more than one inspection device 54 is present on a transport device 50. Herein, the inspection devices 54 can carry out various types of inspections of the containers 5, such as, for example, an optical inspection or an inspection with ultrasound, a non-destructive inspection or a destructive inspection, etc.

The control device 60 controls the first to fourth container-processing machines 10, 20, 30, 40 as well as the transport devices 50 and the inspection devices 54. In addition, the control device 60 carries out its control on the basis of an input by the respective operator 18, 38, 48 at the operating devices 17, 37, 47. Herein, an input by the respective operator 18, 38, 48 on the operating devices 17, 37, 47 also controls the transport device control device 52 of the respective downstream transport devices 50 and the associated inspection device 54.

To control the system 1 and/or the first to fourth container-processing machines 10, 20, 30, 40, the respective operator 18, 38, 48 can operate so that one of the setting value data sets 111, 112, 311, 312, 313, 411, 412 is displayed on the respective operating device 17, 37, 47.

In the following, it is considered an example according to which the operator 18 for controlling the first container-processing machine 10 has made an operation so that the setting value data set 11 is displayed on the operating device 17.

Figure 2:
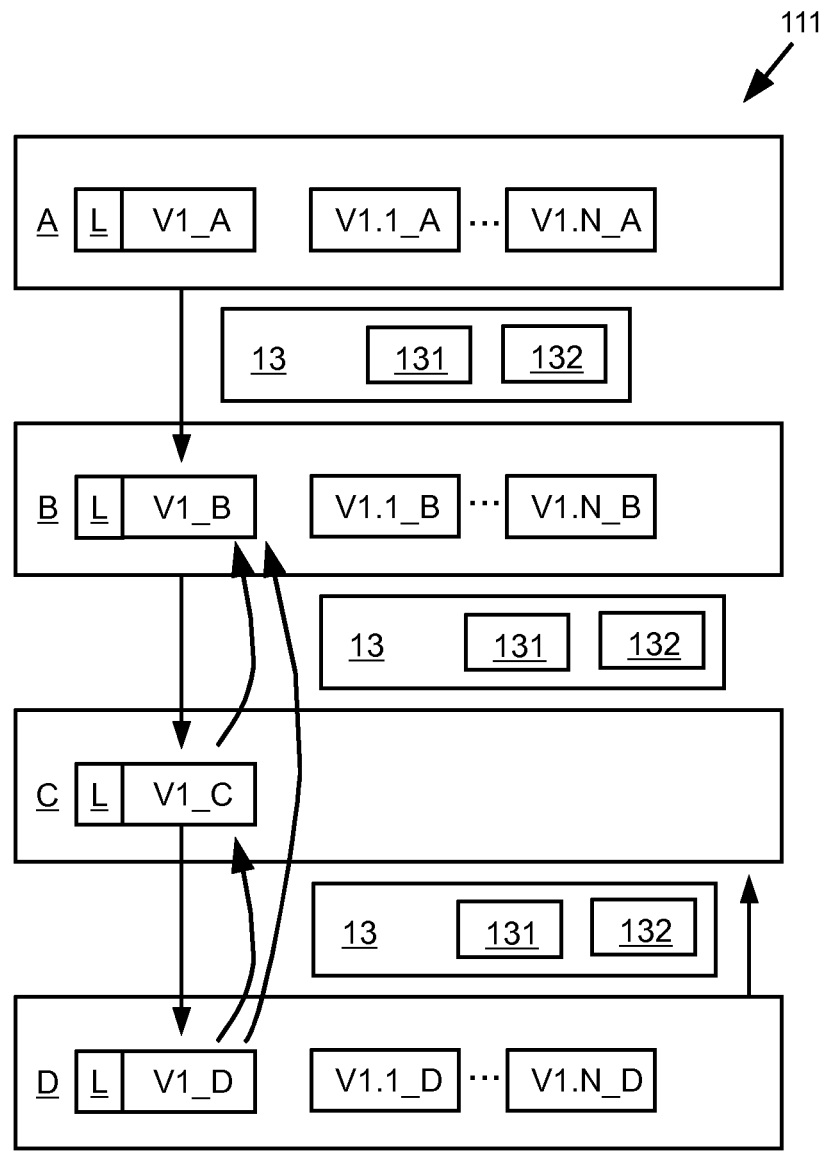
FIG. 2 shows a schematic block diagram to explain the function of the management of various data sets for operating the container-processing system or one of its container-processing machines according to a first embodiment.

FIG. 2 shows the different phases which are possible for the setting value data set 111 with the aid of a management of the management device 13 and which can thus be stored and/or documented in the type memory 11. Optionally, the management device 13 can be supported by the control device 60 or can be at least partially positioned in the control device 60.

The management is the same for the individual setting value data sets 111, 112, 311, 312, 313, 411, 412. The following description is therefore valid for all setting value data sets 111, 112, 311, 312, 313, 411, 412 and machines 10, 30, 40.

According to FIG. 2, there is always a main version V1 for a setting value data set 1111. If necessary, there is also created and saved a predetermined number N of secondary versions V1.1 to V1.N for such a main version V1. In addition, the respective version of the setting value data set 111 always has a predetermined status A to D, which changes in the course of the life cycle of the setting value data set 111, as described below. The status can be:

Status A="New"
Status B="Set"
Status C="Accepted" and thus checked
Status D="Production"

The status A to D thus informs the operator 118 about the current processing status of the setting value data set 111. Of course, it is possible that more or less or different statuses may be provided. However, there are at least two different statuses in order to be able to distinguish between processing statuses of the setting value data set 111. In the special example chosen here, the status A to D results or can be changed as described below.

When creating the setting value data set 111 or the recipe for producing a type in the type memory 11, the management device 13 assigns the setting value data set 111 the status A. In addition, the management device 13 creates a main version V1_A for the setting value data set 111 and stores them in the memory 11. In addition, the management device 13 creates, for the setting value data set 11 or the recipe for producing a type, its own logbook L in which relevant actions are entered. When the setting values data set 111 is created, the management device 13 assigns the same time stamp to the main version V1_A and to the status assignment. The logbook L is independent of the restoration of versions and shows all actions from the initial creation of the setting value data set 111 up to a current use of the data set 111. The logbook L cannot be deleted, reset or manipulated.

A setting value data set 111 is created such that the operator 18 creates the data set or such that the setting value data set 111 is sent to the type memory 11 via communication with the control device 60 or one of the other machines 20, 30, 40.

In addition, the management device 13 manages data 131 about authorizations of the individual operators 18, 38, 48. Depending on the authorization(s) of the individual operators 18, 38, 48 specified in the data 131, the management device 13 allows access to the data set 11 and/or blocks access. The management device 13 thus sets the scope of access to the data set 111.

For example, in case the operator 18 has the "operator" authorization, he can operate to display the main version V1_A or secondary versions V1.1_A to V1.N_A of the setting value data set 111 with the status A on the operating device 17 in order to find out about the relationship. However, the operator 18 having the "Operator" authorization cannot load the main version V1_A or its secondary versions V1.1_A to V1.N_A into the control device (s) 12, 60 for execution or edit the setting value data set 111. For this purpose, the management device 13 links the authorizations of the operator 18 according to the data 131, for example, with buttons on the operating device 17, which are provided for corresponding actions with the setting value data set 111. As a result, the buttons on the operating device 17 are blocked, depending on the authorization of the operator 18, or are functional to carry out the corresponding actions.

In contrast thereto, in case the operator 18 has the "administrator" or "machine manufacturer" authorization, the operator 18 can edit without restriction the main version V1_A or secondary versions V1.1_A to V1.N_A of the setting value data set 111 of the status A. However, the management device 13 provides the operator 18 with information on status A for this purpose. In particular, the management device 13 gives the operator 18 when loading and while using the respective versions of the setting value data set 111 on the operating device 17 a corresponding note 171 that a setting value data set 111 with the status A, especially in the case of improper use, may result in damage to the machine.

In case the setting value data set 111 is copied from another source setting value data set 111, the management device 13 assigns the status A for the main version V1_A or the secondary versions V1.1_A to V1.N_A of the setting value data set 111 regardless of whether the other source setting value data set 111 already had a status B or status C or status D. This ensures that each setting value data set 111 is evaluated once by an operator 18 having the "administrator" or "machine manufacturer" authorization.

As part of the unrestricted editing of a setting value data set 111, the operator 18 having the authorization "administrator" or "machine manufacturer" can make a change to the main version V1_A and save the resulting data set in the memory 11. In this case, the management device 13 generates one of the N secondary versions V1.1_A to V1.N_A in the memory 11 and maintains the main version V1_A. Herein, however, the management device 13 only generates one of the N secondary versions V1.1_A to V1.N_A, if the setting value data set 111 actually differs from the already saved main version V1_A or the previously saved secondary version V1.1_A to V1.N_A differs. With such an intelligent generation of the secondary version V1.1_A to V1.N_A, the management device 13 minimizes the consumption of the memory space in the type memory 11.

The number N of secondary versions V1.1_A to V1.N_A is stored as data 132 in the management device 13. The number N can be set by the operator 18 having the authorization "administrator" or "machine manufacturer" during runtime or during operation of the machine 10. In the event that the predetermined number N of secondary versions V1.1_A to V1.N_A is obtained, the oldest secondary version is deleted in accordance with a ring buffer, when the next secondary version is backed up. In case, for example, a secondary version V1.N+1_A is to be stored, the secondary version V1.1_A would be deleted.

The management device 13, however, offers the possibility that the operator 18 having the authorization "administrator" or "machine manufacturer" returns to one of the secondary versions V1.1_A to V1.N_A or restores it. For this purpose, the management device 13 shows the operator 18 the secondary versions V1.1_A to V1.N_A on the operating device 17 chronologically. When the desired secondary version is restored, all of the later secondary versions are deleted. In case, for example, a secondary version V1.2_A is to be restored from secondary versions V1.1_A to V1.5_A, the secondary version V1.1_A remains stored, whereas secondary versions V1.3_A to V1.5_A would be deleted. This means that a reset function or "undo" function is implemented.

If a safe use of a version of the recipe or the setting value data set 111 is ensured, the operator 18 having the authorization "administrator" or "machine manufacturer" is authorized according to the authorization in the data 131, to increase the status A of one of the versions V1_A or V1.1_A to V1.N_A of the setting value data set 111 to the status B="Set". Due to the status change, the management device 13 overwrites the existing main version V1_A of status A and generates a main version V1_B of status B. In addition, the management device 13 deletes all secondary versions V1.1_A to V1.N_A of status A. This ensures that no versions of the setting value data set 111 can be restored, which do not have status B.

As a result of the status change, an operator 18 having the "operator" authorization can now load the recipe or the setting value data set 111 and produce therewith.

Changes can now be made to the main version V1_B, which are generated by the management device 13 as secondary versions V1.1_B to V1.N_B of the stratus B in addition to the unchanged main version V1_B. For this, the management device 13 proceeds as described above with regard to the main version V1_A and its secondary versions V1.1_A to V1.N_A of status A.

If the recipe or the setting value data set 11 also fulfills all the performances that are expected from the machine 10 according to a predetermined performance catalog, the management device 13 enables the operator 18 having the "machine manufacturer" authorization to increase the status B of one of the versions V1_B or V1.1_B to V1. N_B of the setting value data set 111 to the status C="accepted". Due to the status change, the management device 13 overwrites the existing main version V1_B of status B and generates a main version V1_C of status C. In addition, the management device 13 deletes all secondary versions V1.1_B to V1.N_B of status B. This ensures that no versions of the setting value data set 111 can be restored, which do not have status C.

As a result of the status change, an operator 18 having the "operator" authorization remains authorized to load the recipe or the setting value data set 111 and produce therewith.

In case permanent changes are made to a recipe or the setting value data set 111 having the status C, no secondary version V1.1_C to V1. N_C is generated, but the management device 13 changes the status to the status D="production" and generates for this a main version V1_D having the status D and corresponding secondary version(s) V1.1_D to V1.N_D having the status D. However, the main version V1_C of status C is retained.

As a result, an operator 18 having the "machine manufacturer" authorization can change the recipe or the setting value data set 11 having the status D back to status C. In this case too, the management device 13 deletes the main version V1_D and all secondary versions V1.1_D to V1.N_D having the status D. The change in status from status D to status C can be better if, for example, an original acceptance status is no longer usable due to modifications or wear.

In this way, the recipes or the setting value data sets 111, 112, 311, 312, 313, 411, 412 can be changed flexibly with great reliability for the operation of the system 1.

Figure 3:
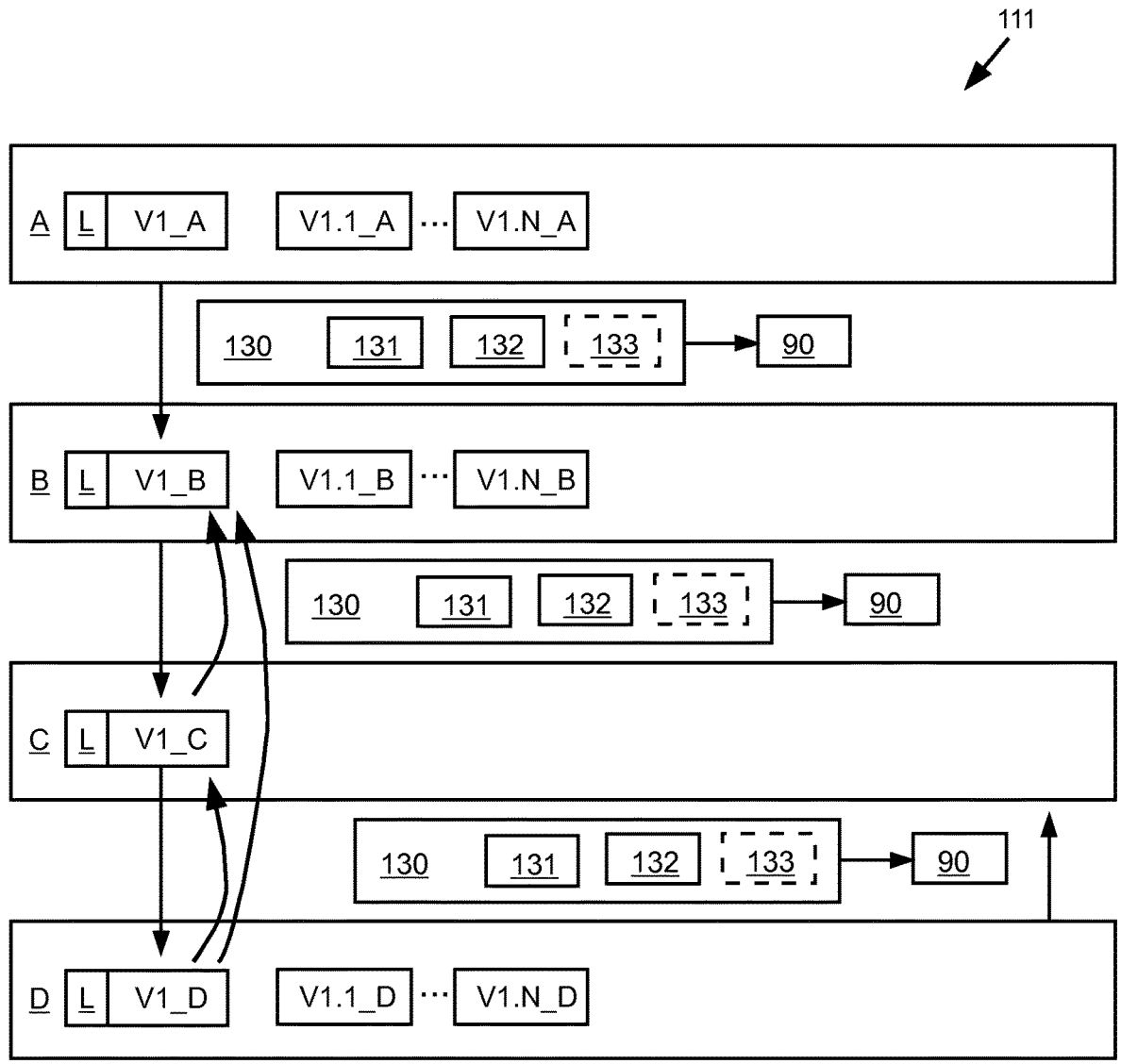
FIG. 3 shows a schematic block diagram to explain the function of the management of various data sets for operating the container-processing system or one of its container-processing machines according to a second embodiment.

FIG. 3 illustrates the function of a management device 130 according to a second embodiment. In addition to the functions of the management device 13 described above, the management device 130 is configured to perform a memory optimization, as described below.

The management device 130 monitors the available memory space in the type memory 11 in order to avoid a production standstill. In case the management device 130 determines that there is a threat of a shortage of memory space in the type memory 11, the management device 130 is configured to delete secondary versions V1.1 to V1.N of the various statuses A to D autonomously. The management device 130 is configured for this purpose to store, without interaction with the operator 18, the secondary versions V1.1 to V1.N on at least one external memory medium 90. The at least one external memory medium 90 is any memory medium, such as, for example, a multiple rewritable memory medium, in particular a hard drive, etc., and/or a one-time writable memory medium, in particular a CD, etc., and/or a memory medium in a cloud, etc. If there is no external memory medium 90 or if there is no longer sufficient memory space on the external memory medium 90, the management device 130 may irretrievably delete the relevant secondary versions V1.1 to V1.N. Depending on the configuration of the management device 130, this can take place with or without interaction with the operator 18.

Optionally, the operator 18, in particular the one having the "administrator" or "machine manufacturer" authorization, can set in data 133 that the secondary versions V1.1 to V1.N are stored in the memory 11 only for a predetermined period of time and are deleted after the predetermined period of time. Before that, the secondary versions V1.1 to V1.N are optionally stored on the at least one external memory medium 90.

Figure 4:
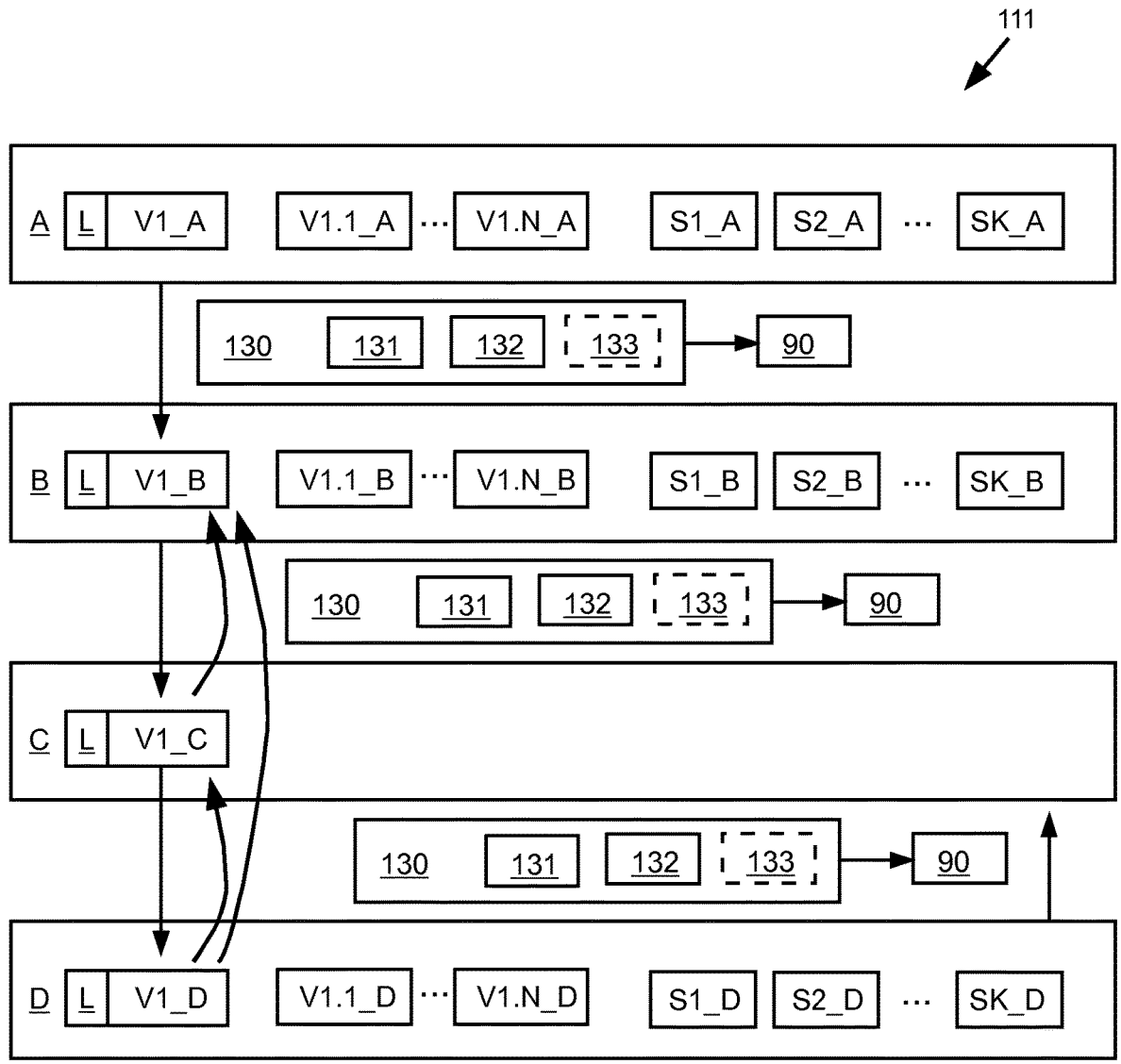
FIG. 4 shows a schematic block diagram to explain the function of the management of various data sets for operating the container-processing system or one of its container-processing machines according to a third embodiment.

FIG. 4 illustrates an additional function for the management device 130 according to a third embodiment. The management device 130 offers the operators 18, 38, 48, in addition to the functions of the management device 13 or 130 described above, the possibility of creating a defined number of memory positions S1 to SK for the various status variants A to D, i.e. S1_A to SK_A of variant A, etc. As a result, an operator 18, 38, 48 can permanently or at least temporarily save a certain progress or status in the processing of the data set 111, regardless of his authorization "operator" etc.

Should one of the memory positions S1 to SK or S1_A to SK_A etc. be restored in the type memory 11 later on, the management device 130 deletes all secondary versions V1.1 to V1.N to the data set 111 in the memory 11. Then, the management of the secondary versions V1.1 to V1.N of the data set 111 in the memory 11 starts again. The same applies if the main version V1 is to be restored. In this case as well, the management device 130 deletes all secondary versions V1.1 to V1.N of the data set 111 in the memory 11.

According to a fourth embodiment, the management device 13 or 130 of the preceding embodiments offers the operator 18 having the "administrator" or "machine manufacturer" authorization a selection on the operating device 17 in order to withdraw or grant to the data set 111 individual reading rights (=loading) and writing rights (=saving). For this purpose, the management device 13 or 130 is configured to display the current release status in an overview of the data sets 111, 112 on the operating device 17.

In this way, unauthorized changes can be prevented during commissioning, such as those made during night shifts in which no operator 18 having the "administrator" or "machine manufacturer" authorization is present.

All of the above-described implementations of the container-processing system 1, the container-processing machines 10, 20, 30, 40, the transport devices 50, the control device 60, the management devices 13, 130 and the method performed by them can be used individually or in all possible combinations. The features of the embodiments and/or their options can be combined with one another as desired. In addition, in particular the following modifications are conceivable.

The elements shown in the figures are depicted schematically and can differ in the specific implementation from the forms shown in the figures provided that the above-described functions are ensured.

The container-processing system 1 of the embodiments can be a disposable system or a reusable system. In a reusable system, containers 5 are produced which are collected again after the product filled therein has been emptied from the container 5 and, after cleaning, are reused to fill in a new product. In contrast to a reusable system, a single-use system produces containers 5 which, after the product filled therein has been emptied, are no longer reused for filling with a new product.

In addition, for example, the first container-processing machine 10 can have a blow molding machine unit, a filling machine unit, a labeling machine unit, etc. arranged directly in a row one behind the other, so that the containers 5 can be transported from the preceding machine unit to the following machine unit by means of a transport device, not shown.

The number of container-processing machines 10, 20, 30, 40 of the container-processing system 1 can be selected as required.

LIST OF REFERENCE SIGNS 1 container-processing system
5 container
6 label
10, 20, 30, 40 container-processing machine
11, 31, 41 type memory
12, 32, 42 machine control device
13 management device
15, 35, 45 outlet
16, 36, 46 conversion device
17, 37, 47 control device
18, 38, 48 operator
50, 55 transport device
52 transport device control device
54 inspection device
60 control device
70 detection device
80 arrow for output direction
90 external memory medium
111, 112 type
130 management device
131, 132, 133 data
171, 371, 471 note
311, 312, 313 type
411, 412 type
A, B, C, D status
L logbook
S1_A to SK_A memory positions for status A
S1_B to SK_B memory positions for status B
S1_D to SK_D memory positions for status D
V1_A to V1_D main versions with status A to D
V1.1_A to V1.N_A secondary versions with status A
V1.1_B to V1.N_B secondary versions with status B
V1.1_D to V1.N_D secondary versions with status D Having described preferred embodiments of the invention, it will be apparent to those skilled in the art to which this invention relates, that modifications and amendments to various features and items can be effected and yet still come within the general concept of the invention. It is to be understood that all such modifications and amendments are intended to be included within the scope of the present invention.

What is claimed is:

1. A container-processing system comprising:
at least one container-processing machine for processing containers, wherein at least one container-processing machine comprises a type memory in which different setting-value data sets for a type of processing to be performed by the container-processing machine are stored and are selectable for processing the containers; and
at least one management device for managing the storing of the setting-value data sets, wherein the at least one management device is configured,
in the event of creation of one of the setting-value data sets, to generate a main version of the data set and to assign a status to the main version, wherein the status informs about the present editing situation of the data set, and wherein the status results from a situation which occurs when creating the data set until the current use of the data set in the production in the container-processing system, to retain the main version, in case a change is made to the main version without a change in the status, and to additionally establish, for the change to the main version, at least one secondary version having the status of the main version;

to set a scope of access to the main version and to the at least one secondary version by an operator of the at least one container-processing machine in dependence on the status and a predefined authorization of the operator, and to assign to each newly created setting-value data set a status (A) in which also to the operator, who has all authorizations to edit the data set, is displayed a note when editing the data set, the note indicating that the data set can cause damages to the at least one container-processing machine.

2. The container-processing system according to claim 1, wherein the at least one management device is configured to overwrite the main version of a first status by a main version of a second status in case the first status is changed to the second status and to overwrite all secondary versions of the first status.

3. The container-processing system according to claim 1, wherein the status comprises the states "new", "set", "accepted", and "production".

4. The container-processing system according to claim 1, wherein the at least one management device is configured to establish a logbook (L) for each setting-value data set when generating the main version and to record in the logbook all actions starting from the initial generation of the data set up to the current use in the processing of the containers.

5. The container-processing system according to claim 1, wherein the at least one management device is configured to store in data what authorization the operator of the at least one container-processing machine has with regard to reading or writing the versions of the data sets for their respective status.

6. The container-processing system according to claim 1, wherein the at least one management device is configured to store in data a maximum number for secondary versions, and wherein the at least one management device is configured to delete the oldest secondary version in order to store a new secondary version, in case the number of secondary versions already stored equals the maximum number for secondary versions.

7. The container-processing system according to claim 6, wherein the at least one management device is configured to provide for the operator, in addition to a maximum number for secondary versions, a predetermined number of memory positions to which the operator may store a secondary version together with the assigned status.

8. The container-processing system according to claim 1, wherein the at least one management device is configured to only store a new secondary version, in case the data set corresponding to the new secondary version differs from the data set of the last secondary version.

9. The container-processing system according to claim 1, wherein the at least one management device is configured to store the main version and/or the secondary version in at least one external memory medium, before the at least one management device deletes the main version and/or the secondary version from the type memory due to a change in status or due to a predetermined demand.

10. The container-processing system according to claim 1, wherein the at least one container-processing machine comprises one or more of a blow molding machine, a cleaning machine, a heat-processing machine, a filling machine, an equipping machine, a packaging machine, or a palletizing machine.

11. A method for safety-oriented management of settings for a container-processing system which comprises at least one container-processing machine for processing containers, wherein at least one container-processing machine comprises a type memory, in which different setting-value data sets for a type of processing to be performed by the container-processing machine are stored and are selectable for processing the containers; wherein the at least one management device performs, for managing the storing of the setting-value data sets, the following steps:

generating, in the event of creation of one of the setting-value data sets, a main version of the data set and assigning a status to the main version, wherein the status informs about the present editing situation of the data set, and wherein the status results from a situation which occurs when creating the data set until the current use of the data set in the production in the container-processing system;

retaining the main version, in case a change is made to the main version without a change in the status, and to additionally create, for the change to the main version, a secondary version having the status of the main version;

setting a scope of access to the main version and to the secondary version by an operator of the at least one container-processing machine in dependence on the status and a predefined authorization of the operator; and assigning to each newly created setting-value data set the status in which also to the operator, who has all authorizations to edit the data set, is displayed a note when editing the data set, the note indicating that the data set can cause damages to the at least one container-processing machine.

12. The container-processing system according to claim 1, wherein the at least one management device is configured to switch an operating device of the at least one container-processing machine depending on the status and the predetermined authorization of the operator such that the operating device is at least partially functional or to at least partially block the execution of the actions.

* * * * *